(12) United States Patent
Mukoyama

(10) Patent No.: US 6,385,018 B1
(45) Date of Patent: May 7, 2002

(54) MAGNETORESISTIVE READ HEAD HAVING REDUCED BARKHAUSEN NOISE

(75) Inventor: Naoki Mukoyama, Kawasaki (JP)

(73) Assignee: Fujitsu Limited, Kawaski (JP)

( * ) Notice: Subject to any disclaimer, the term of this patent is extended or adjusted under 35 U.S.C. 154(b) by 0 days.

(21) Appl. No.: 09/425,463

(22) Filed: Oct. 22, 1999

(30) Foreign Application Priority Data

May 18, 1999 (JP) ............................................ 11-136688

(51) Int. Cl.[7] ................................................ G11B 5/39
(52) U.S. Cl. ............................. 360/324.12; 360/324.11
(58) Field of Search ........................... 360/324.1, 324.11, 360/324.12

(56) References Cited

U.S. PATENT DOCUMENTS

| | | | | |
|---|---|---|---|---|
| 5,608,593 A | * | 3/1997 | Kim et al. .................... | 360/113 |
| 5,739,990 A | * | 4/1998 | Ravipati et al. ............. | 360/113 |
| 5,936,810 A | * | 8/1999 | Nakamoto et al. .......... | 360/113 |
| 6,040,962 A | * | 3/2000 | Kanazawa et al. .......... | 360/113 |
| 6,094,325 A | * | 7/2000 | Tagawa et al. .............. | 360/113 |

FOREIGN PATENT DOCUMENTS

| | | |
|---|---|---|
| JP | 8036712 | 2/1996 |
| JP | 8036716 | 2/1996 |
| JP | 8235542 | 9/1996 |
| JP | 10049832 | 2/1998 |
| JP | 10154314 | 6/1998 |

\* cited by examiner

*Primary Examiner*—Jefferson Evans
(74) *Attorney, Agent, or Firm*—Greer, Burns & Crain, Ltd.

(57) ABSTRACT

The magnetoresistive read head comprises a hard magnetic bias layer formed along the end surface of a magnetoresistive layer or spin valve layer extending over the level plane. The tip end of the hard magnetic bias layer reaches or overlaps the top surface of the magnetoresistive layer. The overlap amount is measured from the tip end of the hard magnetic bias layer to the terminal end of the free magnetic layer. The overlap amount smaller than 0.282 $\mu$m serves to reduce Barkhausen noise appearing in the output from the magnetoresistive layer. In addition, when an inclination angle is set larger than 40° between the end surface and the level plane, a larger amount of hard magnetic bias layer is allowed to cover the top surface of the magnetoresistive layer.

7 Claims, 6 Drawing Sheets

MAGNETORESISTIVE READ HEAD HAVING REDUCED BARKHAUSEN NOISE

BACKGROUND OF THE INVENTION

1. Field of the Invention

The present invention relates to a magnetoresistive (MR) read transducer, such as a spin valve giant magnetoresistive (GMR) read transducer. In particular, the invention relates to a magnetoresistive read head comprising a magnetoresistive layer extending over a level plane, an end surface defined at the end of the magnetoresistive layer by a plane intersecting the level plane, and a hard magnetic bias layer formed along the end surface of the magnetoresistive layer, and to a method of producing the same.

2. Description of the Prior Art

A magnetic read head employing a so-called spin valve giant magnetoresistive (GMR) sensor often includes a pair of hard magnetic bias layers connected to opposite end surfaces or abutting junctions of the spin valve GMR sensor or layer. The hard magnetic bias layers serve to produce a bias so as to reliably unipolarize the free magnetic layer. Such unipolarization or generation of a single domain in the free magnetic layer allows less Barkhausen noise to appear in the output from the magnetic read head.

The end surface of the spin valve GMR sensor may be defined by an inclined plane so as to receive the hard magnetic bias layer with a larger contact area. The increased contact area between the spin valve GMR sensor and the hard magnetic bias layer serves to reduce the electric resistance induced between the spin valve GMR sensor and the hard magnetic bias layer.

In general, the tip end of the hard magnetic bias layer, extending along the inclined end surface, reaches or overlaps the top surface of the spin valve GMR sensor. The increased overlap amount over the top surface of the spin valve GMR sensor causes a larger Barkhausen noise as disclosed in Japanese Patent Laid-open No. 10-49832. However, it is nearly impossible to form the hard magnetic bias layers without allowing the hard magnetic bias layers to overlap over the top surface of the spin valve GMR sensor under the conventional process of producing the magnetic read head comprising a spin valve GMR sensor. It is required to reduce the Barkhausen noise while accepting a relatively larger overlap amount of the hard magnetic bias layer over the top surface of the spin valve GMR sensor.

SUMMARY OF THE INVENITON

It is accordingly an object of the present invention to provide a magnetoresistive read head capable of reducing the Barkhausen noise while accepting a relatively larger overlap amount of hard magnetic bias layers over the top surface of the spin valve GMR layer.

According to the present invention, there is provided a magnetoresistive read head comprising: a magnetoresistive layer extending over a level plane to include a free magnetic layer; an end surface defined at an end of the magnetoresistive layer by an inclined plane intersecting the level plane by an inclination angle larger than 40° and a hard magnetic bias layer allowing its tip end to reach a top surface of the magnetoresistive layer, wherein an overlap amount measured from the tip end of the hard magnetic bias layer to a terminal end of the free magnetic layer is set smaller than 0.282 μm.

The present inventors have found that Barkhausen noise appearing in the output from the magnetoresistive layer has a correlation to the overlap amount measured from the tip end of the hard magnetic bias layer to the terminal end of the free magnetic layer as a result of their unique observation. It has been confirmed that the magnitude of Barkhausen noise depends upon the overlap amount irrespective of the amount of the hard magnetic bias layer covering over the top surface of the magnetoresistive layer. Specifically, as long as the overlap amount is set smaller than 0.282 μm in accordance with the present invention, Barkhausen noise can be suppressed to the utmost. The overlap amount smaller than 0.282 μm accepts a larger inclination angle between the level plane and the end surface of the magnetoresistive layer. Larger inclination angle serves to achieve a larger amount of the hard magnetic bias layer covering over the top surface of the magnetoresistive layer.

In particular, the end surface of the magnetoresistive layer preferably intersects the level plane by the inclination angle larger than 40°. A larger inclination angle set in this manner serves to reliably accept a larger amount of the hard magnetic bias layer covering over the top surface of the magnetoresistive layer.

The magnetoresistive layer may comprise the free magnetic layer, a non-magnetic spacer layer, a pinned magnetic layer and an antiferromagnetic layer, laminated over the level surface in sequence. A multilayer structure of this type is in general called a spin valve GMR sensor, which provides a superior sensitivity irrespective of the velocity of the movement of the magnetic recording medium. The spin valve GMR sensor allows the domain of the pinned magnetic layer to be fixed at a predetermined direction under the influence of the antiferromagnetic layer. On the other hand, the domain of the free magnetic layer is adapted to rotate under the influence of the magnetic field from the magnetic recording medium. Such rotation of the domain serves to change the level of the electric resistance of the spin valve GMR sensor. The change in the electric resistance is utilized to detect the binary data on the magnetic recording medium. It should be noted that the pinned magnetic layer, the non-magnetic spacer layer and the free magnetic layer may be laminated upon the level plane in this sequence in the magnetoresistive layer.

The aforementioned magnetoresistive read head may further comprise a flying head slider exposing the magnetoresistive layer at a bottom surface. Employment of the flying head slider is well known in the field of magnetic disk drives such as a hard disk drive (HDD). However, the magnetoresistive read head may be mounted on a support body other than the flying head slider. In addition, the magnetoresistive read head is also applicable to any magnetic recording medium drive, such as a magnetic tape drive, other than the HDD. Any of the aforementioned magnetoresistive read head can be employed in combination with a write head such as a thin film magnetic head or inductive write head.

Fabrication of the aforementioned magnetoresistive read head may be achieved by a production method comprising: forming a magnetoresistive layer on the surface of a wafer; subjecting ion milling to the magnetoresistive layer with a mask disposed above the surface of the magnetoresistive layer by a predetermined height so as to define on the magnetoresistive layer an end surface intersecting the surface of the wafer; and subjecting sputtering to the surface of the wafer with a target disposed above the surface of the wafer by a predetermined height without removing the mask so as to form a hard magnetic bias layer allowing the tip end to reach the top surface of the magnetoresistive layer from the end surface. Suitable control to the inclination angle of the end surface and the height of the target allows an adjustment to the overlap amount. Control to the inclination angle can be achieved by controlling the height of the mask and the incidence of the ion beams in the ion milling.

In particular, it is preferable to form the magnetoresistive layer and the hard magnetic bias layer continuously in vacuum atmosphere. Continuous formation in vacuum atmosphere in this manner serves to avoid oxidation at the boundary between the magnetoresistive layer and the hard magnetic bias layer, so that it is possible to reduce the electric resistance between the magnetoresistive layer and the hard magnetic bias layer.

Moreover, an inclination angle larger than 40° is preferably defined between the surface of the wafer and the end surface of the magnetoresistive layer in the ion milling. A larger inclination angle set in this manner serves to reliably accept a larger amount of the hard magnetic bias layer covering over the top surface of the magnetoresistive layer. Although a conventional method may be employed to fabricate the aforementioned magnetoresistive read head, Barkhausen noise is reliably suppressed to the utmost in the fabricated magnetoresistive read head.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
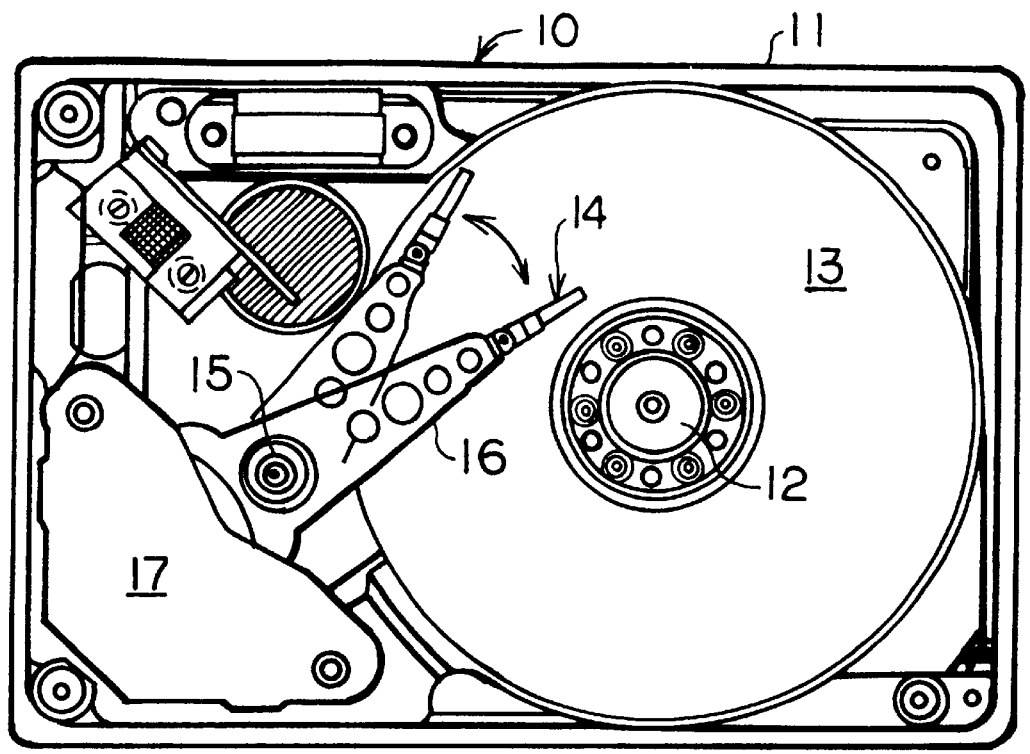
FIG. 1 is a plan view schematically illustrating the interior structure of a hard disk drive (HDD)

FIG. 1 illustrates the interior structure of a hard disk drive unit (HDD) as an example of a magnetic recording disk drive. An enclosure 11 of the HDD 10 contains a magnetic disk 13 mounted on a spindle motor 12, and a magnetic head 14 opposed to the disk surface of the magnetic disk 13. The magnetic head 14 is fixed at the tip end of a carriage arm 16 capable of swinging about a support axis 15. When information is read out of or written into the magnetic disk 13, the carriage arm 16 is driven for swinging movement by an actuator 17, comprising a magnetic circuit, so that the magnetic head 14 can be moved in the radial direction of the magnetic disk 13. Such radial movement serves to position the magnetic head 14 above a target recording or date track on the magnetic disk 13. The opening of the enclosure 11 may be closed with a cover, not shown.

Figure 2:
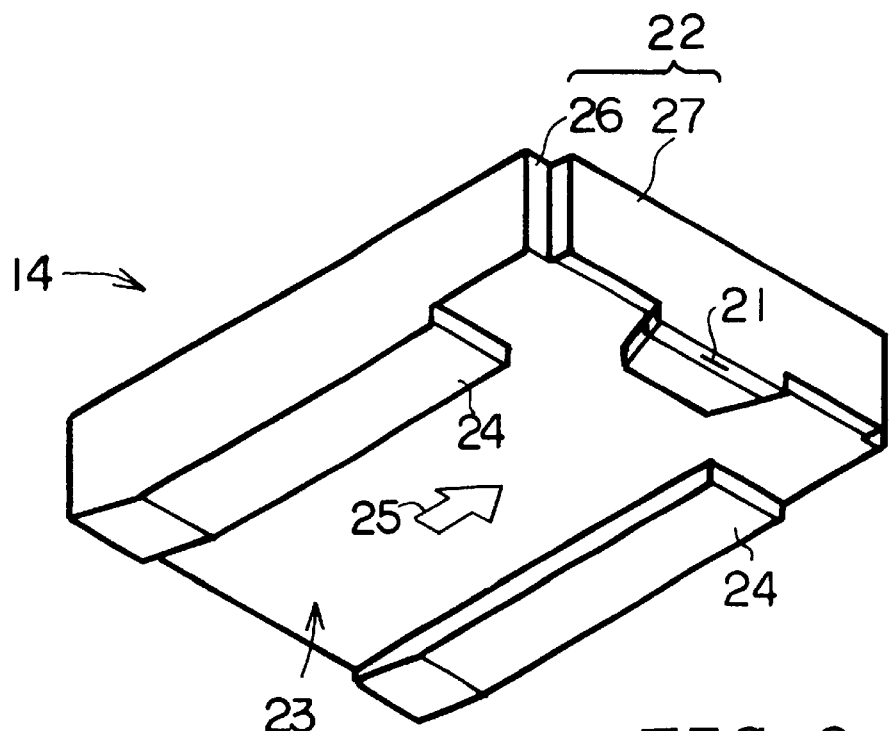
FIG. 2 is an enlarged perspective view illustrating an example of a flying head slider.

FIG. 2 illustrates the structure of the magnetic head 14 in detail. The magnetic head 14 comprises a flying head slider 22 supporting a read/write transducer 21 which is adapted to read and write magnetic information from and to the magnetic disk 13. The flying head slider 22 comprises a pair of rails 24, for example, at the bottom surface 23 opposed to the disk surface of the magnetic disk 13. The rails 24 are designed to define an air bearing surface (ABS) at the bottom surface 23. The flying head slider 22 receives an air flow 25 at the bottom surface 23, in particular, at the ABS so as to fly above the disk surface of the rotating magnetic disk 13. During flight, the read/write transducer 21 exposed at the bottom surface 23 operates to read or write information out of or into the magnetic disk 13. The read/write transducer 21 is embedded in a head containing layer 27 of $Al_2O_3$ coupled to the outflow end of an $Al_2O_3$—TiC body 26. It should be noted that the magnetic head 14 may employ a flying head slider of the other shapes.

Figure 3:
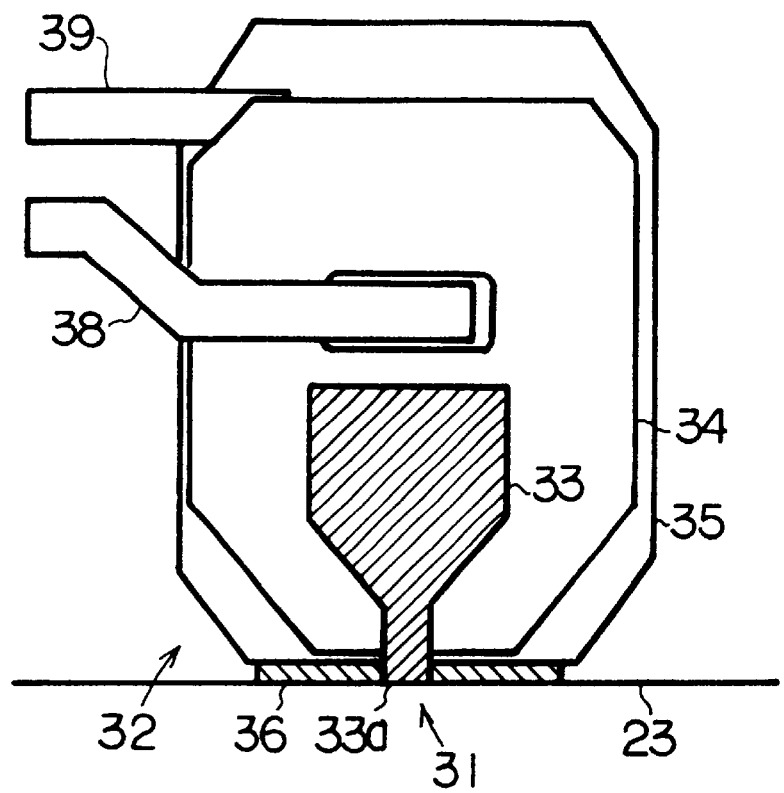
FIG. 3 is an enlarged plan view schematically illustrating the structure of a transducer, in particular, of a thin film magnetic head element.

As shown in FIG. 3, the read/write transducer 21 comprises a thin film magnetic head element or inductive write element 32 with a write gap 31 exposed at the bottom surface 23. The write gap 31 is formed by cooperation of a tip end 33a of a first or upper magnetic yoke layer 33 and a tip end of a second or lower magnetic yoke layer 36. Insulation layers 34, 35 are interposed between the upper and lower magnetic yoke layers 33, 36.

Figure 4:
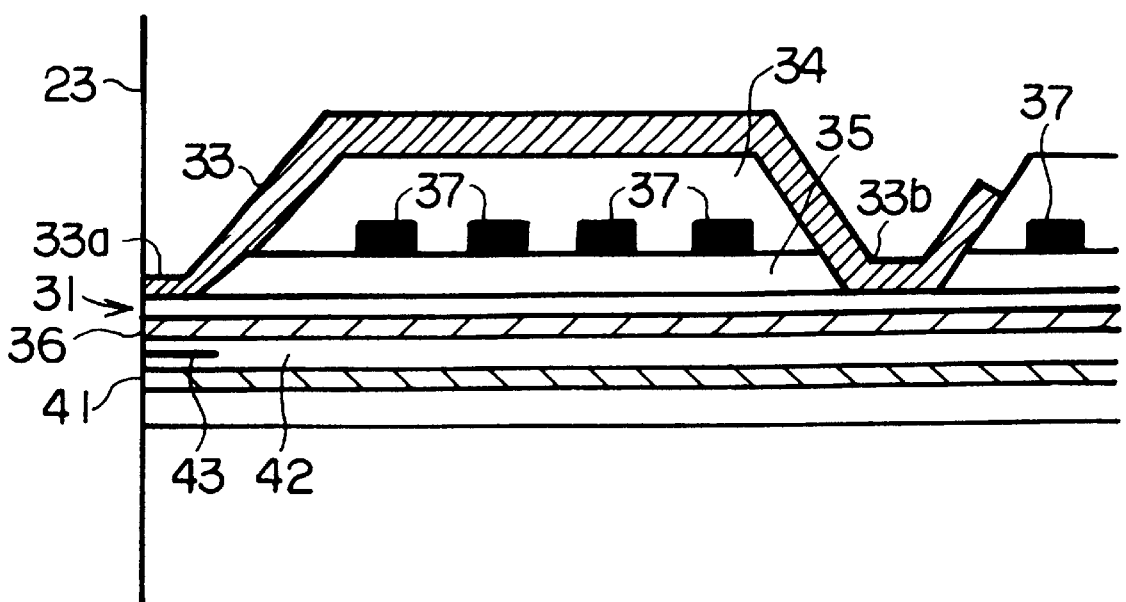
FIG. 4 is a partial sectional view taken along the line 4—4 in FIG. 3.

Referring also to FIG. 4, a swirly electric coil pattern 37 is embedded between the insulation layers 34, 35. A first lead terminal pattern 38 is connected to the central end of the electric coil pattern 37, while a second lead terminal pattern 39 is connected to the outer end of the electric coil pattern 37. When electric current is supplied to the electric coil pattern 37 through the lead terminal patterns 38, 39, a magnetic flux is generated in the upper yoke layer 33 at the rear end 33b penetrating through the center of the electric coil pattern 37. The generated magnetic flux circulates in the upper and lower yoke layers 33, 36. The magnetic flux runs around the gap layer or non-magnetic layer at the write gap 31 so as to generate a magnetic field leaking out at the bottom surface 23. This magnetic field at the write gap 31 acts on the disk surface of the magnetic disk 13, so that information can be recorded in the magnetic disk 13. The upper and lower yoke layers 33, 36 may be formed of NiFe, for example.

Figure 5:
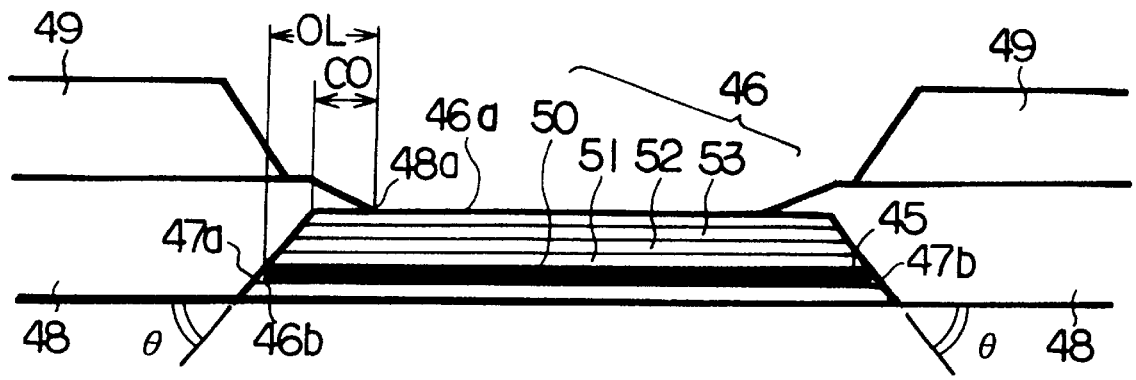
FIG. 5 is an end view illustrating a giant magnetoresistive (GMR) sensor along the bottom surface.

As is apparent from FIG. 4, a magnetoresistive read head or giant magnetoresistive (GMR) element 43 is embedded in an $Al_2O_3$ layer 42 between the lower magnetic yoke layer 36 functioning as an upper shield layer and a lower shield layer 41 of FeN or NiFe. The GMR element 43 is designed to expose its tip end at the bottom surface 23. The GMR element 43 comprises a spin valve multilayer sensor 46 extending over a level plane 45 of the $Al_2O_3$ layer 42, as shown in FIG. 5, for example. A pair of end surfaces or abutting junctions 47a, 47b are defined at the opposite ends of the spin valve multilayer sensor 46 by inclined planes intersecting the level plane 45 by an inclination or taper angle θ. Hard magnetic bias layers 48 are formed to extend along the inclined end surfaces 47a, 47b. The hard magnetic bias layers 48 respectively allow the tip ends 48a to reach the top surface 46a of the spin valve multilayer sensor 46. Electrical lead layers 49 are connected to the hard magnetic bias layers 48, respectively.

The spin valve multilayer sensor 46 comprises a free magnetic layer 50 superposed on the level plane 45. The overlap amount OL can be measured along the level plane 45 from the tip end 48a of the hard magnetic bias layer 48 to the terminal end of the free magnetic layer 50, in other words, to the terminal end 46b of the spin valve multilayer sensor 46. The overlap amount OL is set smaller than 0.282 μm.

A non-magnetic spacer layer 51 is superposed or laminated over the surface of the free magnetic layer 50. A pinned magnetic layer 52 and an antiferromagnetic layer 53 are likewise superposed or laminated in sequence over the non-magnetic spacer layer 51. The spin valve multilayer sensor 46 allows the domain of the pinned magnetic layer 52 to be fixed at a predetermined direction under the influence of the antiferromagnetic layer 53. On the other hand, the domain of the free magnetic layer 50 is adapted to rotate under the influence of the magnetic field of the magnetic disk 13. Such rotation of the domain serves to change the level of the electric signal appearing at the electrical lead layers 49. The change in the level of the output signal can be detected to specify the binary date, for example, on the magnetic disk 13.

Figure 6:
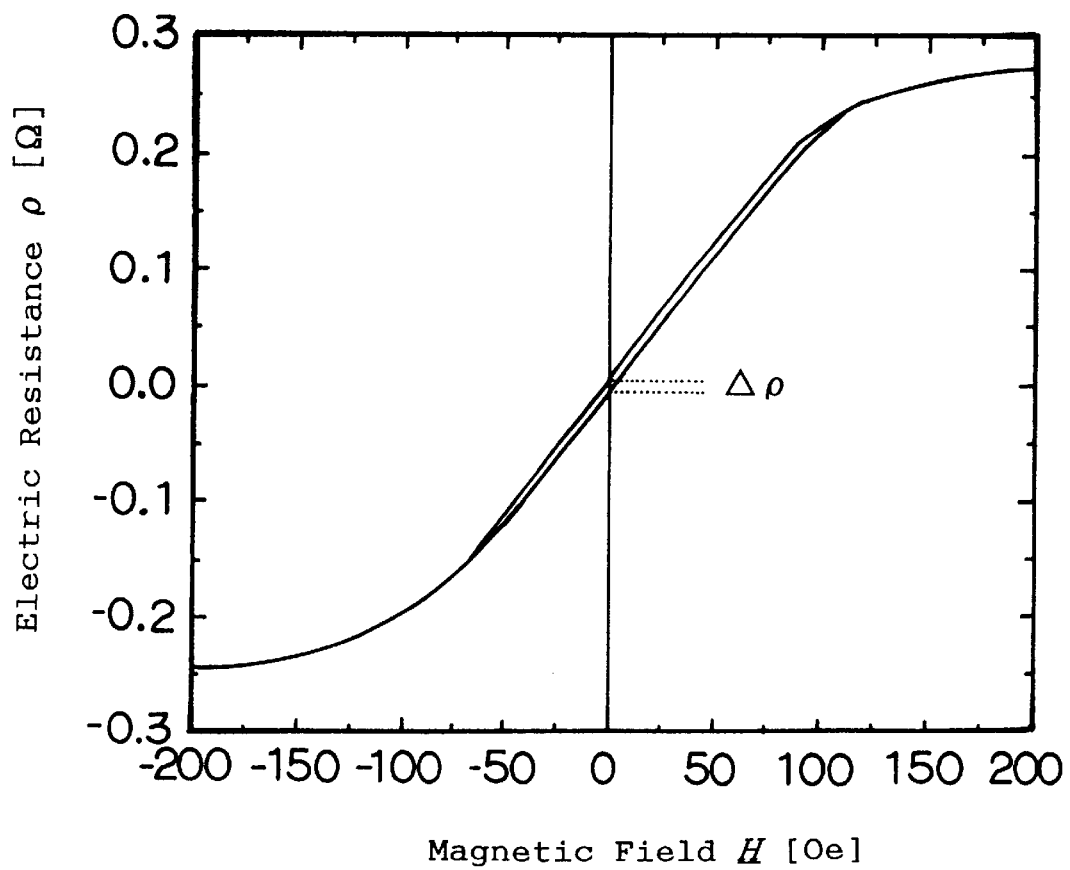
FIG. 6 is a graph illustrating a hysteresis loop for specifying the resistive difference as an index for the magnitude of Barkhausen noise.

Next, the characteristic of the GMR element 43 will be considered. FIG. 6 illustrates a ρ-H curve representing the relationship between the magnitudes of the magnetic field H and the electric resistance ρ. The ρ-H curve, namely, a hysteresis loop provides the resistive difference $\Delta\rho$ at the zero magnetic field. The resistive difference $\Delta\rho$ can be defined as a deviation between the variation curve of the electric resistance ρ at the increase of the magnetic field H and the variation curve of the electric resistance ρ at the decrease of the magnetic field H. It can be said that Barkhausen noise can be reduced or improved as the resistive difference $\Delta\rho$ gets smaller.

Figure 7:
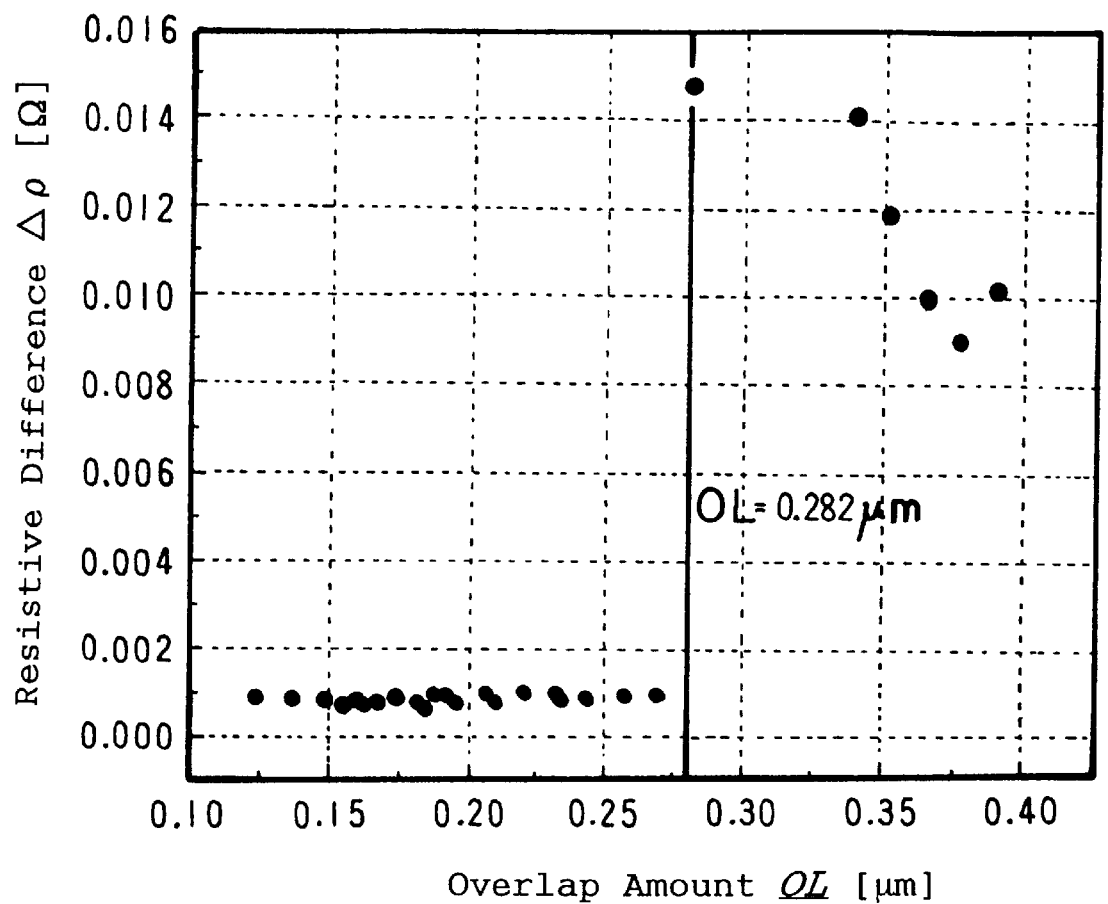
FIG. 7 is a graph illustrating the relationship between the overlap amount and the resistive difference.

The resistive difference $\Delta\rho$ has been observed when the overlap amount OL varies. As shown in FIG. 7, a clear correlation can be found between the overlap amount OL and the resistive difference $\Delta\rho$. It has been revealed that the resistive difference $\Delta\rho$ can be suppressed at a lower level when the overlap amount OL is set smaller than 0.282 μm, irrespective of the amount CO (see FIG. 5, for example) of the top surface 46a covered with the hard magnetic bias layer 48. Such suppression of the resistive difference $\Delta\rho$ serves to reduce Barkhausen noise.

Figure 8:
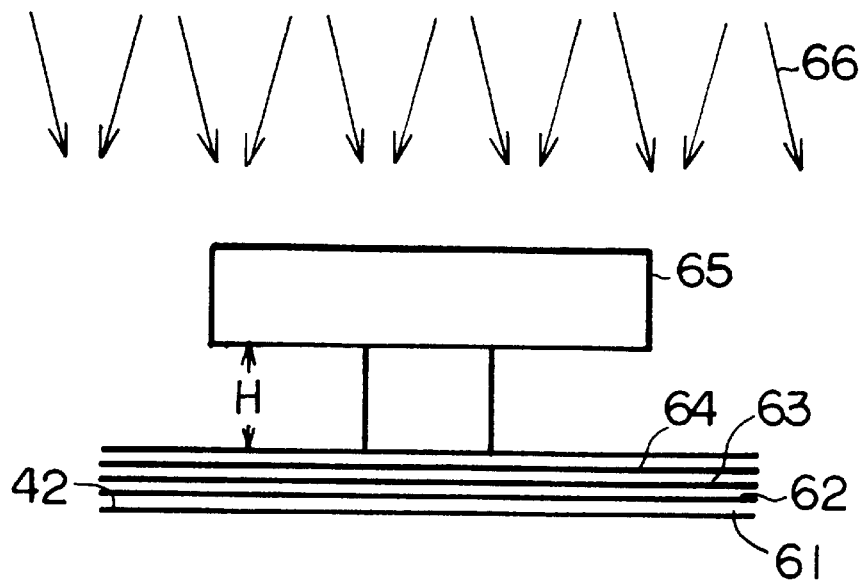
FIG. 8 is a partial sectional view of a wafer for schematically illustrating a method of forming the spin valve GMR sensor.

Next, the description will briefly be made on production of the GMR element 43. First of all, the $Al_2O_3$ layer 42 is laminated or deposited over the lower shield layer 41 on a wafer or substrate as is conventionally known. A CoNiFe layer 61, a Cu layer 62, a CoNiFe layer 63 and a FeMn layer 64 are then in sequence laminated or deposited over the $Al_2O_3$ layer 42 for providing the free magnetic layer 50, the non-magnetic spacer layer 51, the pinned magnetic layer 52 and the antiferromagnetic layer 53, respectively, as shown in FIG. 8.

Figure 9:
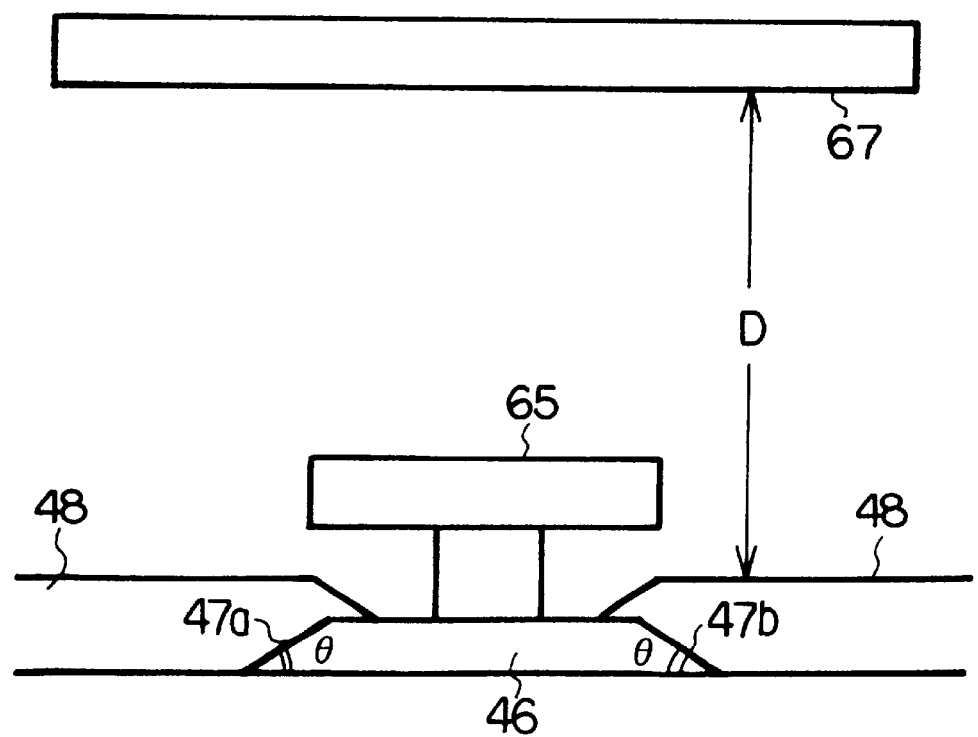
FIG. 9 is a partial sectional view of the wafer for illustrating a method of forming the hard magnetic bias layer.

When the spin valve multilayer material 61–64 has been formed, two layers of resist lamination are formed on the FeMn layer 64 so as to establish a stencil 65. The stencil 65 is designed to provide a mask maintained above the top surface of the spin valve multilayer material 61–64 by a predetermined height H. The mask forms an undercut. When the spin valve multilayer material 61–64 is subjected to ion milling with ion beams 66 of a controlled incidence as shown in FIG. 9, for example, the end surfaces 47a, 47b can be formed at the spin valve multilayer material 61–64 so as to intersect the surface of the wafer by the inclination angle θ. The spin valve multilayer sensor 46 can accordingly be obtained. The inclination angle θ may be determined by the height H of the stencil 65 above the top surface of the spin valve multilayer material 61–64 and the angle of incidence of the ion beams 66.

Subsequently, the surface of the wafer is subjected to sputtering with a target 67 set above the surface of the wafer by a predetermined height D. The stencil 65 is maintained. The sputtering in this manner serves to form the hard magnetic bias layers 48 along the end surfaces 47a, 47b of the spin valve multilayer sensor 46. The overlap amount OL should be set smaller than 0.282 μm. The adjustment to the overlap amount OL can be achieved by controlling the inclination angle θ and the height D of the target 67. For example, when the stencil 65 is maintained at the height H=0.2 μm above the spin valve multilayer sensor 46 of the thickness d=471 A (angstrom), the following condition can be found to achieve the overlap amount OL.

| Height D of Target | Overlap Amount OL [μm] | | |
|---|---|---|---|
| [mm] | θ = 8° | θ = 13° | θ = 18° |
| 110 | 0.390232 | 0.282078 | 0.233368 |
| 165 | 0.376432 | 0.268278 | 0.219568 |
| 210 | 0.365132 | 0.256978 | 0.208268 |
| 265 | 0.351432 | 0.243278 | 0.194568 |
| 310 | 0.340132 | 0.231978 | 0.183268 |

Figure 10:
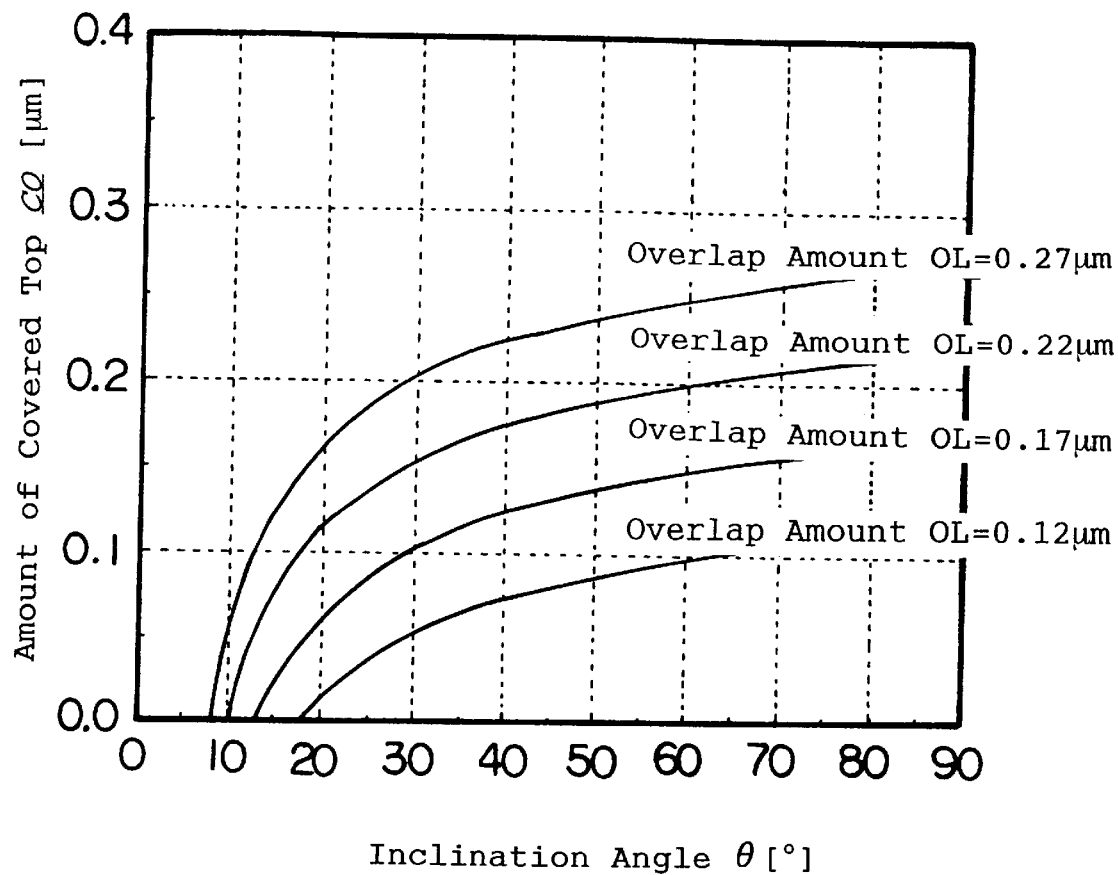
FIG. 10 is a graph illustrating the relationship between the inclination angle and the amount of covered top.

According to the above condition, the target 67 may be disposed at the H larger than 110 mm if the inclination angle θ takes 13 degees. The reduction in the height H of the target 67 in this manner serves to accelerate the deposition of the hard magnetic bias layers 48. In addition, if the inclination angle θ is set equal to or larger than 18 degrees, the height H of the target 67 can be set at any value according to the above table of condition. The increase in the inclination angle θ in this manner serves to allow the amount CO of the covered top surface to increase. FIG. 10 illustrates the relationship between the inclination angle θ and the amount CO of the top surface 46a covered with the hard magnetic bias layer 48 when the overlap amount OL is kept at predetermined values (=0.27 μm, 0.22 μm, 0.17 μm and 0.12 μm).

It is preferable to continuously conduct the aforementioned processes of forming the spin valve multilayer sensor 46 and of forming the hard magnetic bias layers 48 in vacuum atmosphere. Continuous deposition in vacuum atmosphere serves to avoid oxidation at the boundary between the spin valve multilayer sensor 46 and the hard magnetic bias layers 48, so that is is possible to reduce the electric resistance between the spin valve multilayer sensor 46 and the hard magnetic bias layers 48.

It should be noted that the aforementioned GMR element 43 may be employed without any write element such as the aforementioned thin film magnetic head element 32. The GMR element 43 according to the present invention may also be employed in any magnetic recording medium drive such as a magnetic tape drive in addition to the aforementioned hard disk drive (HDD).

What is claimed is:

1. A magnetoresistive read head comprising:
   a magnetoresistive layer extending over a level plane to include a free magnetic layer;
   an end surface defined at an end of the magnetoresistive layer by an inclined plane intersecting the level plane by an inclination angle larger than 40°; and a hard magnetic bias layer allowing its tip end to reach a top surface of the magnetoresistive layer, wherein an overlap amount measured from the tip end of the hard magnetic bias layer to a terminal end of the free magnetic layer is set from about 0.125 to 0.282 μm.

2. The magnetoresistive read head according to claim 1, wherein said magnetoresistive layer comprises the free magnetic layer, a non-magnetic spacer layer, a pinned magnetic layer and an antiferromagnetic layer, laminated over the level surface in sequence.

3. The magnetoresistive read head according to claim 1, further comprising a flying head slider exposing the magnetoresistive layer at a bottom surface.

4. A magnetic recording medium drive comprising:

a magnetic recording medium;

a slider opposed to a surface of the magnetic recording medium; and a magnetoresistive read head exposed at a bottom surface of the slider, wherein said magnetoresistive read head comprises:

a magnetoresistive layer extending over a level plane to include a free magnetic layer;

an end surface defined at an end of the magnetoresistive layer by an inclined plane intersecting the level plane by an inclination angle larger than 40°; and a hard magnetic bias layer allowing its tip end to reach a top surface of the magnetoresistive layer, wherein an overlap amount measured from the tip end of the hard magnetic bias layer to a terminal end of the free magnetic layer is set from about 0.125 to 0.282 μm.

5. The magnetic recording medium drive according to claim 4, wherein said magnetoresistive layer comprises the free magnetic layer, a non-magnetic spacer layer, a pinned magnetic layer and an antiferromagnetic layer, laminated over the level surface in sequence.

6. The magnetic recording medium drive according to claim 4, wherein said magnetic recording medium is a magnetic disk.

7. The magnetic recording medium drive according to claim 6, wherein said slider is a flying head slider staying above the surface of the magnetic recording medium during read operation.

* * * * *